No. 812,756. PATENTED FEB. 13, 1906.
E. S. LEA & J. DEGEN.
BEARING.
APPLICATION FILED MAY 6, 1905.
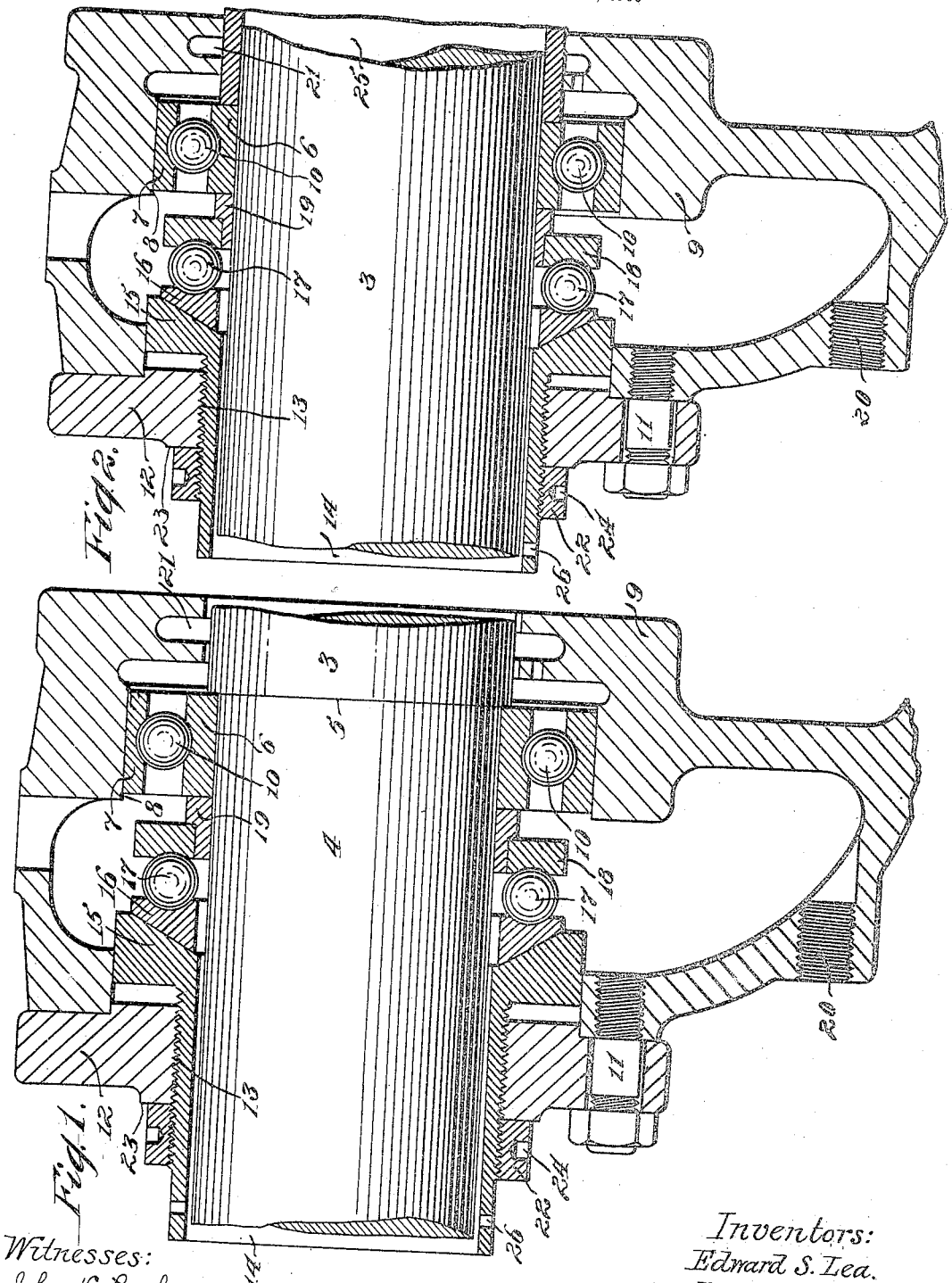
Witnesses:
John H. Lynch,
Fred H. Barnacle
Inventors:
Edward S. Lea.
Julius Degen.
By their attorney:
F. H. Richards.

UNITED STATES PATENT OFFICE.

EDWARD S. LEA AND JULIUS DEGEN, OF TRENTON, NEW JERSEY, ASSIGNORS, BY MESNE ASSIGNMENTS, TO LEA-DEGEN PUMP COMPANY, OF TRENTON, NEW JERSEY, A CORPORATION OF NEW JERSEY.

BEARING.

No. 812,756.

Specification of Letters Patent.

Patented Feb. 13, 1906.

Application filed May 6, 1905. Serial No. 259,151.

*To all whom it may concern:*

Be it known that we, EDWARD S. LEA, a citizen of the United States, and JULIUS DEGEN, a citizen of the Republic of Switzerland, residing at Trenton, in the county of Mercer and State of New Jersey, have invented certain new and useful Improvements in Bearings, of which the following is a specification.

The invention has reference to means for supporting and for adjusting a shaft in the plane parallel to its axis.

The invention further comprehends an adjustable device, a shaft which is supported in a bearing, may be shifted relatively to the bearing, and may thereafter be maintained at will in the position to which it has been shifted.

An embodiment of the invention is illustrated by the accompanying sheet of drawings, whereon—

Figure 1 illustrates a bearing-frame and shaft and means for shifting the shaft relatively to the frame, and Fig. 2 illustrates a construction which is a modification of that which is illustrated in Fig. 1.

Similar characters of reference indicate corresponding parts in the illustrations.

In the form illustrated in Fig. 1 the shaft 3 may be provided with a reduced portion 4, creating a shoulder 5, against which may take a ball-bearing race 6, corresponding to a race 7, and which may be mounted in a seat 8 of the frame 9 and between which may operate a circuit of balls 10. Secured to the frame 9—for instance, by a bolt 11—may be a collar 12, which in the present instance may be internally screw-threaded, as at 13, to receive an externally-screw-threaded member 14, having a flange 15, which may impinge a ball-race 16, which holds the circuit of balls 17 against an additional ball-race 18, which may be mounted upon a sleeve 19, which takes against the ball-race 6. When the member 14 is shifted parallel to the longitudinal axis of the shaft 3 by turning the same in bearing-collar 12—for instance, by an implement which may take into sockets 26—said shaft may be likewise shifted parallel to its axis, it being understood, of course, that there will be at least two of these bearings for each shaft and that it will be necessary to adjust such bearings at the same time. The bearing just described may be furnished with a suitable lubricant, which may be injected through the opening, in which the ball-bearings may run, and when it is desired to furnish the bearings with a new lubricant the old may be drawn off through the opening 20. For the purpose of preventing the lubricant from oozing out from the bearing such lubricant as may fly from the parts may take into a duct 21, which is provided with an outlet leading back into the chamber. When the shaft 3, as well as the bearing just described, are suitably adjusted to proper position, such adjustment may be maintained by causing the jam-nut 22, carried by the screw-threaded member 14, to be brought against the face 23 of the collar, and this jam-nut may be brought into position by a suitable implement which may take into sockets 24, formed into said nut. It will now be seen that the shaft 3 may be shifted or adjusted by the bearings whereby to effect such relative positions of such shaft as may be desired.

In the form illustrated in Fig. 2 the shaft 3 may be provided with a collar 25, which may be set upon or secured to the shaft in any suitable manner, and the ball-race 6 may bear against this collar instead of the shoulder 5. (Shown in Fig. 1.)

Having thus described this invention, we claim—

1. In a device of the character specified, the combination with a frame, of an abutment on a shaft moving in said frame, a ball-bearing race adapted to bear against said abutment, another ball-bearing race corresponding to the first-mentioned race, balls running therein a member abutting one of the first-named races, a race carried thereby, a race corresponding thereto, balls running therein, means to shift the ball-races laterally, and thereby the shaft, and means to hold the shifting means in fixed position.

2. In a device of the character specified, the combination with a frame, of a sleeve fixed to a shaft moving axially in said frame, a ball-bearing race adapted to bear against said sleeve, another ball-bearing race corresponding to the first-mentioned race, balls running therein, a member abutting one of the first-named races, a race carried thereby, a race corresponding thereto, balls running therein, a screw-threaded collar secured to said frame, means to shift the second ball-bearing race relatively to the frame and movable in said collar, and means to maintain a fixed position, at will, of the parts.

3. In a device of the character specified, the combination with a frame, of a shaft movable therein in two opposite directions, a collar fixed on said shaft, ball-races, one of which impinges said collar, balls in said race, an additional ball-race adapted to impinge the first races, a race corresponding with it, balls running therein, a sleeve surrounding the shaft and adapted for lateral impingement against one of the races, said sleeve having screw-threads on the outer side thereof a collar internally screw-threaded, and carried by the frame, and in which the sleeve moves axially, a jam-nut carried by the sleeve, lubricating means in said frame.

EDWD. S. LEA
JULIUS DEGEN.

Witnesses as to Edward S. Lea:
 FRED W. BARNACLO.
 F. W. HUTCHINSON
Witnesses as to Julius Degen:
 JOHN H. MURRAY,
 W. A. HOLCOMB.